Feb. 21, 1967  R. E. GAURA  3,304,723
PROPORTIONAL THRUST VALVE FOR SPACE VEHICLE CONTROL SYSTEM
Filed Aug. 10, 1965

INVENTOR
ROBERT E. GAURA

BY Harry A. Herbert Jr
ATTORNEY

Richard J Killoren
AGENT

United States Patent Office 3,304,723
Patented Feb. 21, 1967

3,304,723
PROPORTIONAL THRUST VALVE FOR SPACE
VEHICLE CONTROL SYSTEM
Robert E. Gaura, Campbell, Calif., assignor to the United
States of America as represented by the Secretary of
the Air Force
Filed Aug. 10, 1965, Ser. No. 478,778
3 Claims. (Cl. 60—233)

This invention relates to a thrust valve for a space vehicle control system.

One object of the invention is to provide a lightweight proportional thrust valve for a space vehicle control system which is compact, reliable and inexpensive to build.

Another object of the invention is to provide a thrust valve which uses a bellows that provides poppet preload and which nullifies any unbalance force due to varying supply pressure.

A further object of the invention is to provide a thrust valve which makes use of the pilot gas used to obtain main stage thrust to provide a vernier thrust and which eliminates the undesirable torques acting on the space vehicle due to venting of the pilot gas.

These and other objects will be more fully understood from the following detailed description taken with the drawing, wherein.

The prior art thrust valves used were complicated and too sensitive for the job they must do. Also, in these valves the pilot gas, used to obtain main stage thrust control, was vented overboard through holes in the torque motor cover where they performed no useful function and caused undesirable torques to act upon the vehicle.

According to this invention a more compact valve is provided which makes use of the pilot gas to obtain useful thrust.

Figure 1:
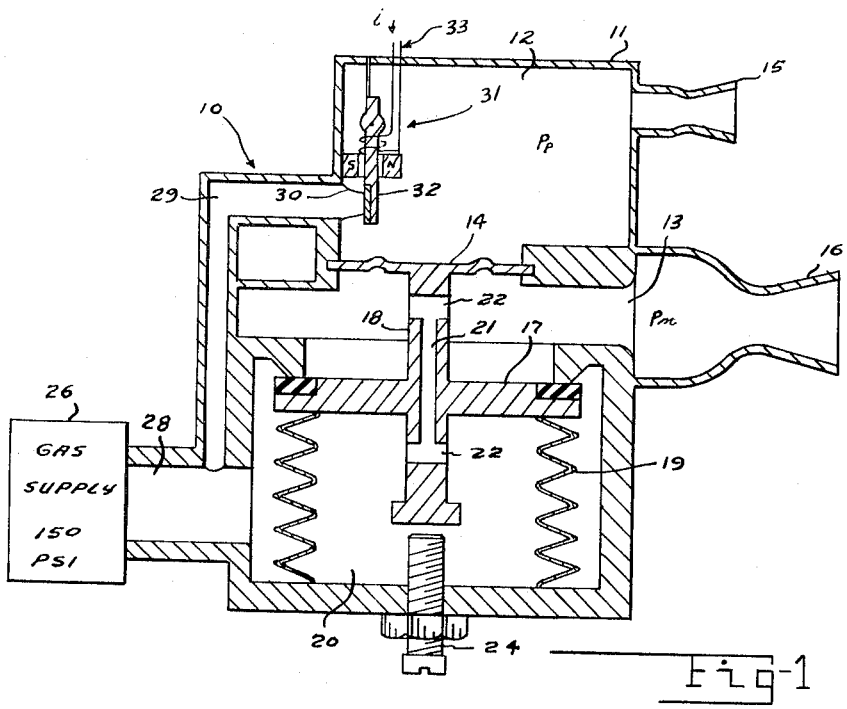
FIG. 1 is a sectional view of a thrust valve according to the invention.

With reference to FIG. 1, reference number 10 shows a thrust valve having a housing 11, with a pilot stage thrust chamber 12, and a main thrust chamber 13, separated by a diaphragm 14. A small vernier nozzle 15 is connected to the pilot stage thrust chamber 12 and a main nozzle 16 is connected to the main thrust chamber 13.

Figure 2:
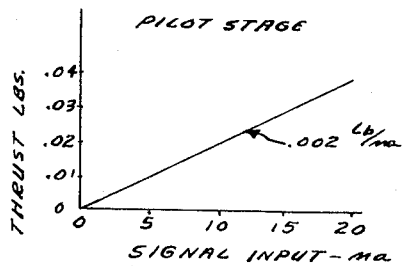
FIG. 2 shows the performance diagram of lbs. thrust vs. signal input in milliamps for the pilot stage.
Figure 3:
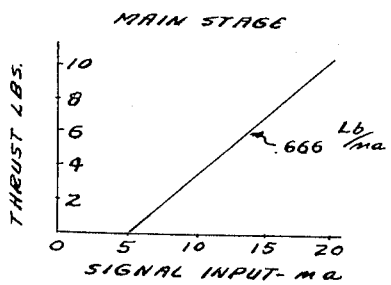
FIG. 3 shows the performance diagram of lbs. thrust vs. signal input in milliamps for the main stage thrust.

Both of these nozzles are of standard convergent-divergent De Laval design. The sizes of the respective throat diameters are determined by the thrust levels selected for the vernier and main stages, however, the throat diameter of nozzle 15 will always be some fractional part of the diameter of nozzle 16. For example, with the thrust levels shown in FIGS. 2 and 3, with a main stage nozzle throat diameter of approximately .6 inch, the vernier nozzle would have a throat diameter of approximately .04 inch.

A valve 17 is connected to the diaphragm 14 by means of stem 18. A spring bellows 19 is hermetically connected to the valve 17 and housing 11.

Chamber 13 is in communication with chamber 20 within spring bellows 19 by means of central passage 21 and two bore holes 22 in the valve stem 18. Other communication means such as openings through the valve 17 can be provided, if desired. An adjustable stop 24 controls the length of the stroke. A supply of compressed gas, for example nitrogen, from supply 26 is connected to inlet 28. The working fluid may be compressed hot or cold gas. A pilot supply passage 29 ending with a nozzle 30 is provided between inlet 28 and chamber 12. A torque motor 31 controls the movement of a flapper 32 to control the flow of gas from nozzle 30 into pilot chamber 12. For a general discussion of flapper valves see pages 16–19 of "Electrohydraulic Servomechanisms" by Allen C. Morse.

In the operation of the thrust valve, a signal is applied to torque motor 31 over leads 33 to move the flapper 32 away from the nozzle 30. A regulated pilot pressure $P_p$ is built up in chamber 12. The variable pilot chamber pressure is converted to useful thrust as the gas expands through convergent-divergent nozzle 15. When the pressure in the pilot chamber 12 reaches a value high enough to overcome the pressure of spring bellows 19, valve 17 is moved away from its seat and a pressure $P_n$ is built up in the main thrust chamber 13. The gas in main thrust chamber 13 is fed to the main thrust nozzle 16. The passage 21 in valve 17 acts to hold the pressure inside the bellows 19 at the same pressure as chamber 13 so that there is no net force across the poppet-seat assembly.

There is thus provided a lightweight proportional thrust valve for a space vehicle control system which is compact, reliable, and inexpensive to build.

While a certain specific embodiment has been described in detail, it is obvious that numerous changes may be made without departing from the general principle and scope of the invention.

I claim:

1. A thrust device comprising: a housing having a first chamber and a second chamber separated by a wall; a first convergent-divergent nozzle connected to said first chamber; a second convergent-divergent nozzle of smaller throat diameter connected to said second chamber; a high pressure gas supply connected to said housing; valve means within said housing for controlling the flow of gas to said first chamber; a spring bellows hermetically connected to said valve means and the wall of said housing for holding said valve in its closed position; means, in said valve means for, admitting gas into said bellows when said valve is open to balance the pressure on said valve means; a diaphragm, in the wall between said first chamber and said second chamber, and operatively connected to said valve means; means for controlling the flow of gas into said second chamber to control the flow of gas to said second nozzle and the movement of said diaphragm to control the opening and closing of said valve means.

2. A thrust device comprising: a housing having a first chamber and a second chamber separated by a wall; a first convergent-divergent nozzle connected to said first chamber; a second convergent-divergent nozzle of smaller throat diameter connected to said second chamber; a high pressure gas supply connected to said housing; valve means within said housing for controlling the flow of gas to said first chamber; a spring bellows hermetically connected to said valve means and the wall of said housing for holding said valve in its closed position; means, for, admitting gas into said bellows when said valve is open to balance the pressure on said valve means; a diaphragm, in the wall between said first chamber and said second chamber, and operatively connected to said valve means; means for controlling the flow of gas into said second chamber to control the flow of gas to said second nozzle and the movement of said diaphragm to control the opening and closing of said valve means and means for controlling the stroke of said valve means.

3. A thrust device comprising: a housing having a first chamber and a second chamber separated by a wall; a first convergent-divergent nozzle connected to said first chamber; a second convergent-divergent nozzle of smaller throat diameter connected to said second chamber; a high pressure gas supply connected to said housing; first valve means within said housing for controlling the flow of gas to said first chamber; a spring bellows hermetically connected to said valve means and the wall of said housing for holding said valve in its closed position; means, in said valve means for, admitting gas into said bellows when said valve is open to balance the pressure on said valve means; a diaphragm, in the wall between said first chamber and said second chamber, and operatively connected to said valve means; a second valve means within said housing for controlling the flow of gas to said second chamber; a torque motor having its armature connected to said second valve; means for controlling the flow of gas into said second chamber to control the flow of gas to said second nozzle and the movement of said diaphragm to control the opening and closing of said valve means; a coil winding surrounding said torque motor armature and means for applying a control signal to said coil; and means for controlling the stroke of said first valve means.

No references cited.

CARLTON R. CROYLE, *Primary Examiner.*